United States Patent [19]
Pecor

[11] Patent Number: 4,854,072
[45] Date of Patent: Aug. 8, 1989

[54] FISHING BLADE ASSEMBLY

[76] Inventor: Gerald D. Pecor, 162 Cooper Rd., Milton, Vt. 05468

[21] Appl. No.: 253,079

[22] Filed: Oct. 4, 1988

[51] Int. Cl.$^4$ ........................ A01K 89/00; A01K 91/00
[52] U.S. Cl. ................................... 43/43.12; 43/43.15
[58] Field of Search .................. 43/43.1, 43.12, 43.15, 43/44.88, 44.92, 27.4, 42.18

[56] References Cited

U.S. PATENT DOCUMENTS

| | | | |
|---|---|---|---|
| 1,670,185 | 5/1928 | Bond | 43/43.15 |
| 2,545,185 | 3/1951 | Winslow | 43/43.12 |
| 2,924,907 | 2/1960 | Hamilton | 43/43.15 |
| 3,738,047 | 6/1973 | Tozer | 43/43.12 |
| 3,961,437 | 6/1976 | Lewis | 43/43.12 |
| 3,968,587 | 7/1976 | Kammeraad | 43/43.12 |

*Primary Examiner*—Kurt Rowan
*Attorney, Agent, or Firm*—Thomas N. Nieman

[57] ABSTRACT

The assembly comprises a cable clamp that is connected directly to a fishing downrigger cable thereby making a semi-permanent connection that is adjustable to any position on the cable. The clamp has a wire attached which has a series of blades strung along in series to attract attention of the fish. At the end opposite the cable clamp, a line release mechanism is positioned. This mechanism has the fishing line pass through it and this mechanism will release the fishing line when a certain predetermined pressure, in terms of the weight and force of the fish attacking the bait, is sensed. This action allows the fisherman to battle only the fish and not the excess line and blades which would occur if the entire blade line were released or if the blade assembly were attached directly to the fishing line.

3 Claims, 1 Drawing Sheet

FISHING BLADE ASSEMBLY

This invention pertains to fishing devices, and in particular to such fishing devices for use with a downrigger trolling system that has a cable clamp to attach a blade assembly to the downrigger cable and a line release mechanism for release of the fishing line separate from the blade system and the downrigger or trolling mechanism.

The field of sport fishing is one that has a large following and with the invention of the downrigger trolling system, the primary method used for sportfishing is trolling. In conjunction with the standard fishing equipment used for trolling, it is desirable to use a blade assembly to attract fish to your bait. The standard practice for rigging this blade system is to attach the fishing line and the blade system in series to the downrigger cable. When a fish hits the bait and hook, the fishing line and the blade assembly will release and allow the fisherman to reel in the fish. The difficulty that comes into play using this method of rigging is that the fisherman has to struggle, not only against the fish itself, but also against the excess weight and drag of the blade system which is considerable, even to the point of not knowing if there is actually a fish on the line.

Clearly, it is desirable for a trolling system that does not contain the limitations described above and at the same time is simple and practical to operate. It is the object of this invention, then to set forth an improved fishing blade assembly which avoids the disadvantages limitations, above-recited, which obtain in prior fishing blade release assemblies.

It is also the object of this invention to teach a fishing blade assembly which is simple to install and use and that will enable the fisherman to easily have all the advantages of a fishing blade assembly, while minimizing the above-listed limitation. Particularly, it is the object of this invention to set forth a fishing blade assembly, for use when trolling with downrigger equipment, comprising clamping means; said clamping means has means for coupling to a downrigger cable; said clamping means has wire means attached thereto; blade means; said blade means comprise a plurality of flattened plates; said blades being fastened to said wire at various points of said wire; release means; said release means affixed to said wire at the end opposite said clamping means; and said release means has holding means for permitting predetermined transitory attachment of a fishing line.

Further objects and features of this invention will become more apparent by the reference to the following description taken in conjunction with the accompanying figures, in which.

Figure 1:
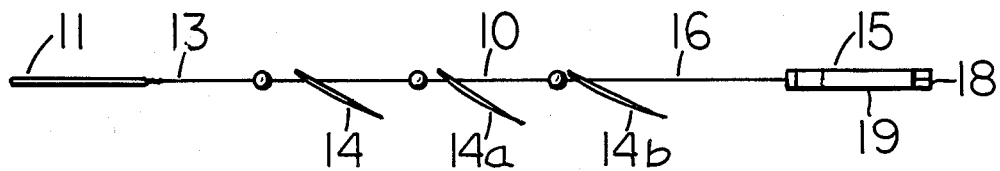
FIG. 1 is an top view of the novel fishing blade assembly.
Figure 2:
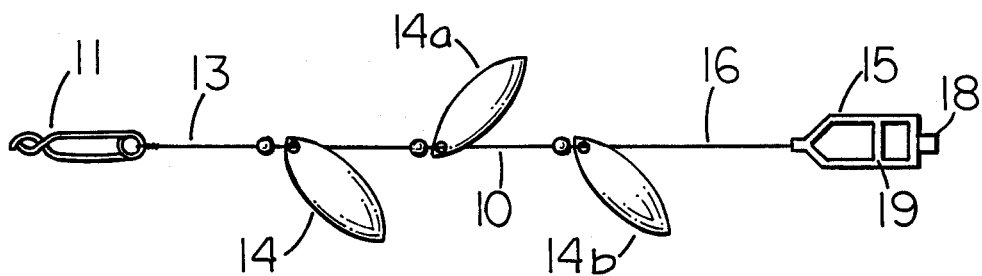
FIG. 2 is a side elevational view thereof.
Figure 3:
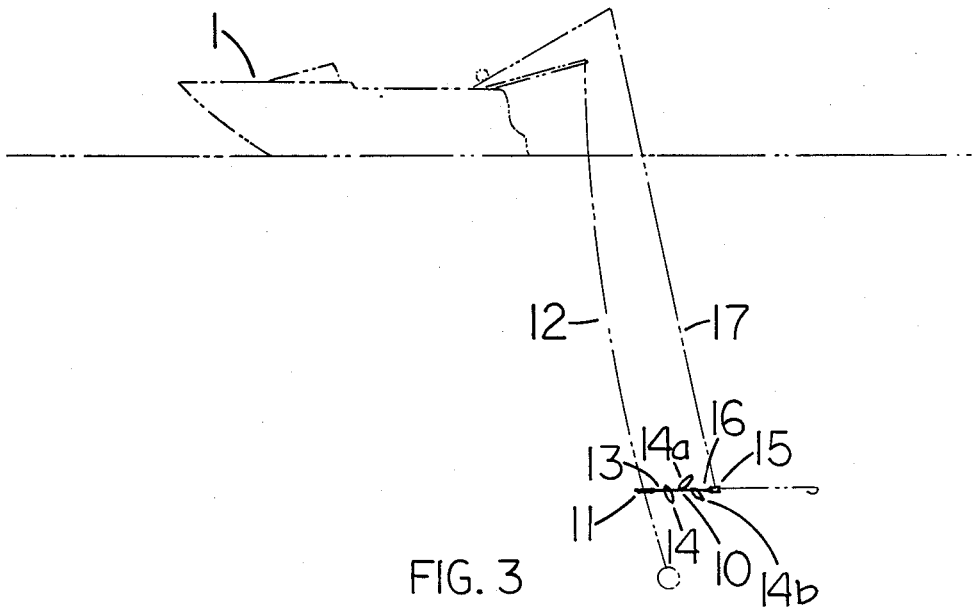
FIG. 3 is a perspective view of the novel fishing blade assembly in a downrigger trolling system.

As shown in the figures, the fishing blade assembly 10 is comprised of a clamp 11 that is attached to a downrigger cable 12. A blade wire 13 is connected to the clamp 11 and a number of blades 14, 14a and 14b are attached to the blade wire 13. A pressure release mechanism 15 is attached to the blade wire 13 at the end 16 opposite the end that the clamp 11 is connected. The fishing line 17 is then run through this pressure release mechanism 15. This mechanism 15 can be of many forms that are standard in the field. The main features of release mechanisms are that the main section 19 can be pinched together to allow for a fishing line to be placed between the split portions of the far end 18 of the mechanism. The main section uses compressible metal, as the embodiment does, or use a spring located at the center of the main section. When the split portions are released, they hold the fishing line until a fish strikes and the line is pulled from the release. The blade wire is usually made of multiple strands of steel or stainless steel and the blades are designed to rotate around the blade wire and to reflect light in order to attract fish.

In operation, the fisherman will attach the clamp of the blade assembly to the downrigger cable at a desired position and then attach the fishing line to the pressure release mechanism and then lower the downrigger cable and fishing line to the desired depth for trolling. A slow forward speed is maintained by the boat 1 which allows the fisherman to reel out fishing line and downrigger cable to the desired depth for fishing. The boat then is free to troll.

While I have described my invention in connection with specific embodiments thereof, it is clearly to be understood that this is done only by way of example and not as a limitation to the scope of my invention as set forth in the objects thereof and in the appended claims.

I claim:

1. A fishing blade assembly, for use when trolling with downrigger equipment, comprising:
    clamping means;
    said clamping means having means for coupling to a downrigger cable;
    said clamping means having wire means attached thereto;
    blade means;
    said blade means comprising a plurality of flattened plates for drawing attention of the fish;
    said blades being fastened to said wire at various points along said wire;
    release means;
    said release means being affixed to said wire at the end opposite said clamping means; and
    said release means having holding means for permitting predetermined transitory attachment of a fishing line.

2. A fishing blade assembly, according to claim 1, wherein:
    said clamping means comprising a connection mechanism to enable the assembly to be attached directly to said downrigger cable for providing a semi-permanent connection to said cable.

3. A fishing blade assembly, according to claim 1, wherein:
    said release means comprising a pressure release mechanism to allow said fishing line to be freed upon a predetermined pressure on said release means.

* * * * *